United States Patent [19]

Langenhorst et al.

[11] 4,418,746

[45] Dec. 6, 1983

[54] PLATE-TYPE HEAT-EXCHANGER AND MANIFOLD ASSEMBLY

[75] Inventors: Günter Langenhorst; Christoph Langenhorst, both of Bad Sassendorf, Fed. Rep. of Germany

[73] Assignee: Top-Element Bauelemente für Innenausbau and Raumgestaltung GmbH & Co. KG, Hamm, Fed. Rep. of Germany

[21] Appl. No.: 348,264

[22] Filed: Feb. 12, 1982

[30] Foreign Application Priority Data

Aug. 26, 1981 [DE] Fed. Rep. of Germany ....... 3133790

[51] Int. Cl.³ .............................. F28F 9/04; F28F 9/14
[52] U.S. Cl. ......................................... 165/76; 165/77; 165/175; 126/448; 285/197; 285/404
[58] Field of Search ................... 165/175, 170, 76, 77; 285/197, 404; 126/447, 448; 248/68 R

[56] References Cited

U.S. PATENT DOCUMENTS

| | | | |
|---|---|---|---|
| 635,534 | 10/1899 | Florin | 285/197 |
| 1,974,402 | 9/1934 | Templeton | 285/137 R |
| 2,790,652 | 4/1957 | Risley et al. | 285/197 |
| 4,150,720 | 4/1979 | Brackman | 165/170 |
| 4,235,281 | 11/1980 | Fitch et al. | 165/170 |
| 4,269,172 | 5/1981 | Parker et al. | 165/76 |

Primary Examiner—William R. Cline
Assistant Examiner—Theophil W. Streule, Jr.
Attorney, Agent, or Firm—Karl F. Ross

[57] ABSTRACT

A heat exchanger has a heat-exchange plate having an edge and formed with a plurality of parallel spaced-apart longitudinal passages opening at the edge and with a plurality of transversely throughgoing plate holes at the edge between the passages. A manifold pipe formed with a row of manifold holes all opening in the same direction and spaced apart the same as the passages at the edge can be fitted to the plate with the plate edge over the row of manifold holes so that each of the passages is aligned longitudinally with a respective one of the manifold holes. A pair of L-section guides fixed on the pipe flank the row of manifold holes and define a gap corresponding to the shape of the plate at the edge. These guides are formed between the manifold holes with laterally throughgoing guide holes transversely alignable with the plate holes when the edge is fitted over the row of manifold holes. A plurality of holders can be engaged transversely through the aligned guide and plate holes for securing the plate to the manifold pipe for fluid flow between the passages and the interior of the pipe. A row of O-ring seals overlies the row of manifold holes to form tight joints where each manifold hole joins a plate hole.

10 Claims, 7 Drawing Figures

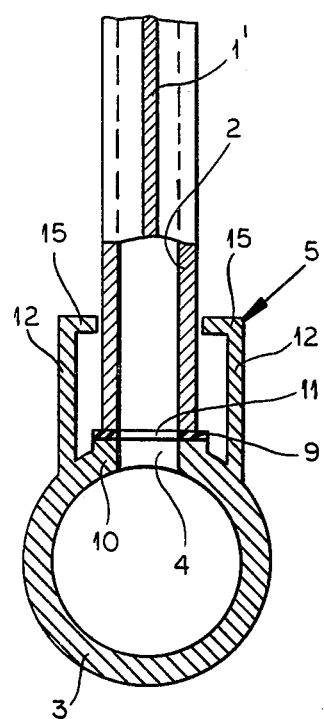
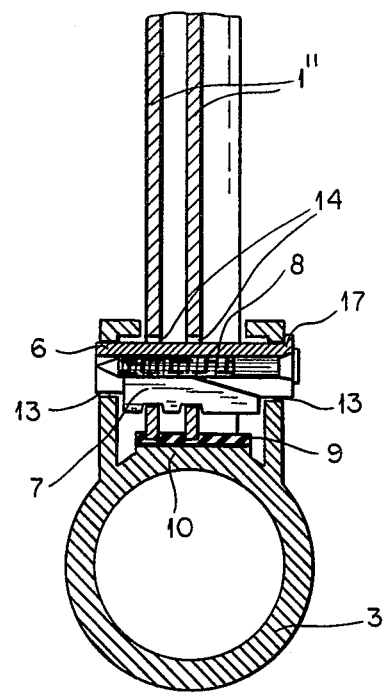
FIG. 2    FIG. 3
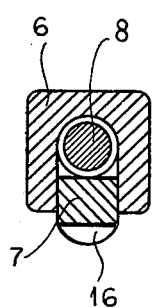
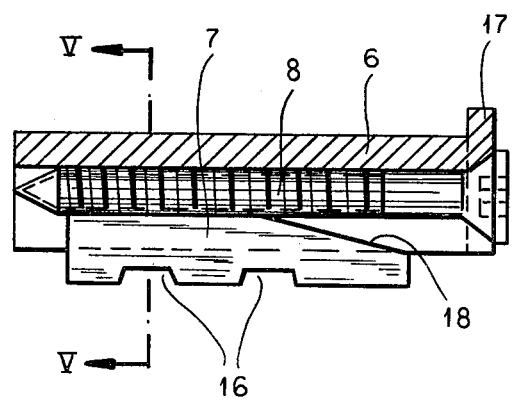
FIG. 5    FIG. 4

PLATE-TYPE HEAT-EXCHANGER AND MANIFOLD ASSEMBLY

FIELD OF THE INVENTION

The present invention relates to a plate-type heat exchanger and manifold assembly. More particularly this invention concerns such an assembly usable as a solar-heat collector or as a heating-system radiator.

BACKGROUND OF THE INVENTION

A standard assembly of the above-described type has a plate-type heat exchanger which forms a plurality of parallel passages opening at opposite edges of the plates. Manifolds are provided at the plate edges. Liquid is pumped from the one manifold to the other through the plate passages to pick up or give off heat through the walls of of the plate unit. When used as a solar collector the plate is exposed to the sun so that the liquid picks up heat, and when used as a radiator the liquid gives off its heat to the air around the heat exchanger.

So long as such assemblies are relatively small, they are normally made as integral welded units. An upper limit to the size is normally the standard construction size of 4'×8'. Larger assemblies must be assembled on the job.

Accordingly it is standard practice to assembly large plate-type heat exchangers at the site. This is most easily done simply by connecting together a group of small units of the integral type described above. Such a construction results in a heat exchanger that has the high cost per unit of surface area of a small exchanger as well as a great many joints constituting potential leaks, and at the same time the ratio of effective surface area to volume is inefficiently low.

Accordingly it has been suggested to make the exchangers from separate manifold and plate units that are bolted together. Normally the plate is formed of a plurality of sections selected to give the desired total surface area, and then manifolds of appropriate length are selected. The joints between the plate edges where the passages open and the manifolds are made either by welding or bolting. Welding is obviously a difficult process that requires expert workers. Bolting, with interposition of a seal between the plate edge and the manifold, is somewhat easier, but requires relatively complicated manufacturing techniques to produce the necessary connecting holes, studs, and the like, and that has the disadvantage of occasionally producing a bad joint that must be opened up and rebuilt to stop a leak.

OBJECTS OF THE INVENTION

It is therefore an object of the present invention to provide an improved plate-type heat-exchanger and manifold assembly.

Another object is the provision of such a plate-type heat-exchanger and manifold assembly which overcomes the above-given disadvantages.

A further object is to provide a heat exchanger which can be relatively easily assembled on the job and that will be very unlikely to leak.

SUMMARY OF THE INVENTION

These objects are attained according to the instant invention in a heat exchanger comprising a heat-exchange plate having an edge and formed with a plurality of parallel spaced-apart longitudinal passages opening at the edge and with a plurality of transversely throughgoing plate holes at the edge between the passages. A manifold pipe formed with a row of manifold holes all opening in the same direction and spaced apart the same as the passages at the edge can be fitted to the plate with the plate edge over the row of manifold holes so that each of the passages is aligned longitudinally with a respective one of the manifold holes. A pair of L-section guides fixed on the pipe flank the row of manifold holes and define a gap corresponding to the shape of the plate at the edge. These guides are formed between the manifold holes with laterally throughgoing guide holes transversely alignable with the plate holes when the edge is fitted over the row of manifold holes. Means including a plurality of holders can be engaged transversely through the aligned guide and plate holes for securing the plate to the manifold pipe for fluid flow between the passages and the interior of the pipe.

A seal strip is compressed between the plate edge and the manifold at the manifold holes and is formed with seal-strip holes aligned with the manifold holes. It is also possible to use O-rings engaged between the plate and the manifold, each between a plate hole and the respective manifold hole.

The two L-shaped guides therefore form a U-section seat in which the plate edge can fit snugly. Thus the assembly according to the instant invention can relatively easily be assembled right on the job, on a roof if necessary. The pieces are fitted together, the holders are inserted and tightened, and the assembly is complete.

According to this invention the guides are unitary with the manifold pipe. The manifold pipe can be extruded of aluminum with the appropriate cross section, and later bored out for the manifold and guide holes. The seal strip can be cast directly on the wall of the pipe at the manifold holes so that it does not constitute a separate element that could shift or get lost prior to assembly of the exchanger.

In addition the plate has a pair of opposite faces at least one of which is nonplanar. The guides have lips closely transversely juxtaposed with and complementarily shaped to the faces of the plate at the edge thereof when the one edge is fitted over the row of holes. Thus the U-section seat formed by the two guides and the face of the manifold between them is complementry to the plate edge.

The guide and plate holes each have at least one flat side and the holders are of corresponding section. Thus the holders cannot rotate when fitted in the aligned guide and plate holes. Each of the holders has a U-section holder part normally engaging only the guide holes and a wedge part normally engaging only the plate holes and bearing against the respective U-section holder part in such a direction as to urge the edge of the plate longitudinally against the manifold pipe. In addition each of the holders further has a screw engageable between the respective holder part and wedge for urging same apart. The wedges are each formed with a notch engaged over the respective plate at the respective plate hole and with a rim flatly engageable with one of the guides when inserted into the guide and plate holes. Such a holder can be produced at relatively low cost and will still be extremely reliable. It can be inserted by hand and tightened with a conventional screwdriver to turn the resultant assembly into a rigid unit.

It is also possible according to this invention for the holders to include clamps engaged around the manifold pipes.

DESCRIPTION OF THE DRAWING

The above and other features and advantages will become more readily apparent from the following, reference being made to the accompanying drawing in which:

FIGS. 2 and 3 are sections taken along line II—II and III—III, respectively, of FIG. 1;

FIG. 4 is a large-scale view of the holder according to this invention;

FIG. 5 is a section taken along line V—V of FIG. 4;

SPECIFIC DESCRIPTION

Figure 1:
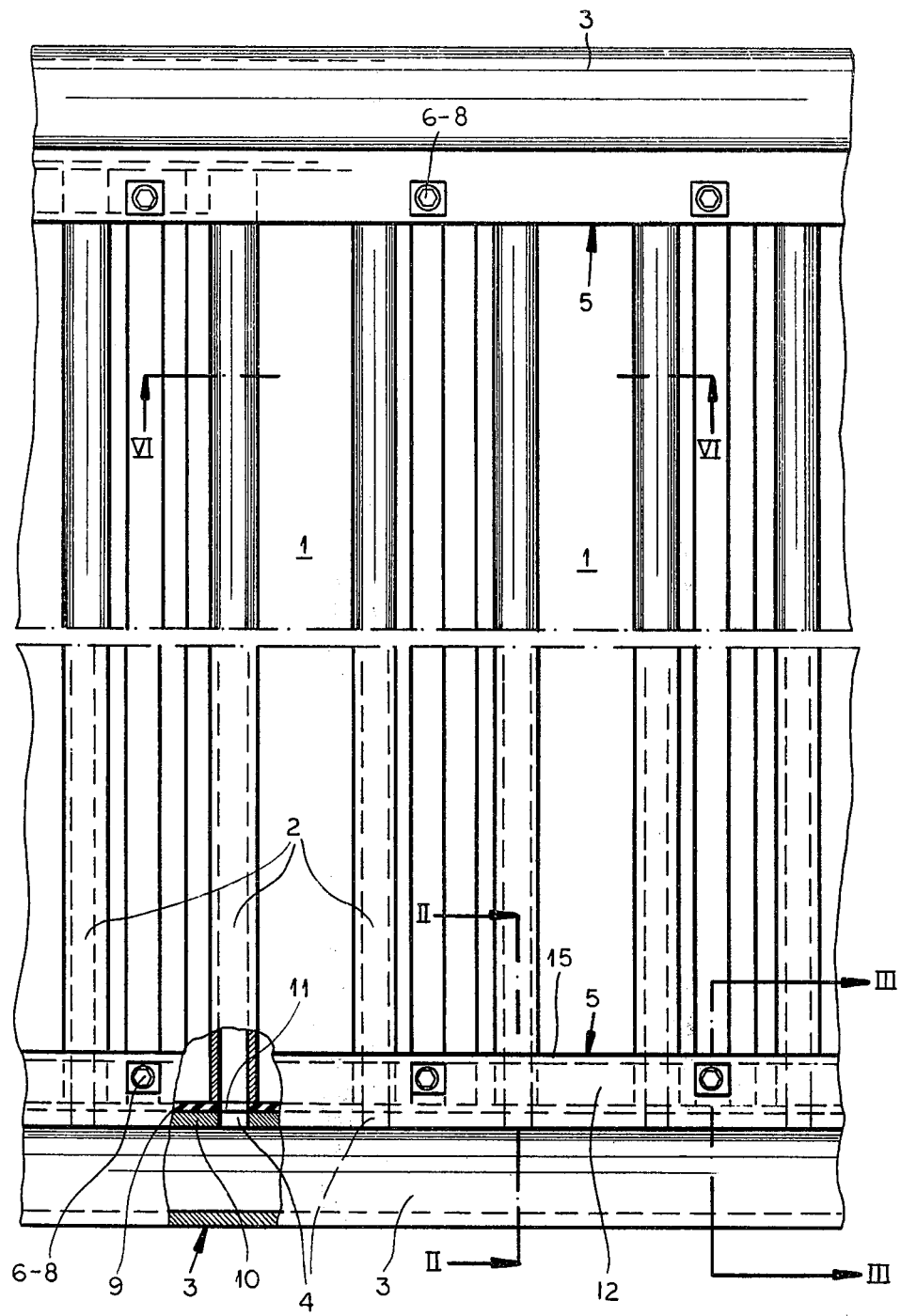
FIG. 1 is a side view of the heat exchanger according to this invention.
Figure 6:
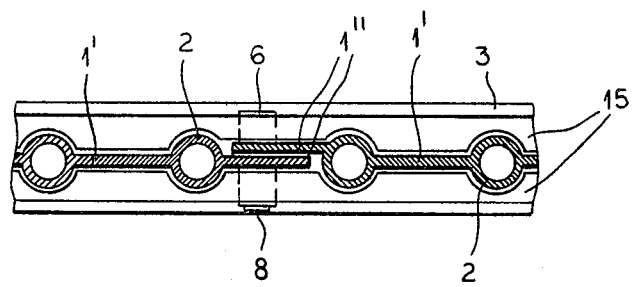
FIG. 6 is a section taken along line VI—VI of FIG. 1.

As seen in FIG. 1 a plurality of plate-type heat-exchanger elements 1 normally are formed by extrusion of aluminum with integral parallel tubes 2 of cylindrical section. Each such plate 1 has two such tubes joined by a central web 1' and having parallel end webs 1" one of which is slightly offset from the other which lies in the plane of the central web 1'. Identical manifold pipes 2 are provided at the top and at the bottom of the plates 1 and are formed with manifold holes 4 that are spaced identically to the tubes 2 of adjacent joined-together plates 1.

The lower manifold pipe 3, which is identical to the upper manifold pipe 3, forms an upwardly U-section seat 5 formed by a pair of guides 12 flanking the row of holes 4 and by the upper wall 10 of the pipe 3. The guides 12 have inwardly directed lips 15 that are closely juxtaposed with the respective faces of the plates 1 as best seen in FIGS. 2 and 3.

A seal strip 9 formed with holes 11 aligned with the holes 4 sits atop the planar upper face of the upper wall 10 of the pipe 3. This seal 9 may be cast right on the wall 10.

The assembly is held together by holders 6–8 best seen in FIGS. 3–6. Each such holder comprises a square- and U-section outer element 6, a wedge 7, and a screw 8. The guides 12 and flanges 1" are formed with respective square-section holes 13 and 14 that align when the plates 1 are positioned so that the bores 4 align with the tubes 2 and that are just slightly larger than the outer elements 6. Thus an outer element 6 with a respective wedge 7 can be fitted into the aligned holes 13 and 14, so that notches 16 on the base of the wedge 7 fit over the lower edges of the two bores 14 of the outer webs 1" and so that a flange 17 fits flatly against the face of one of the guides 12. The complementary square shapes of the outer element 6 and the holes 13 and 14 prevent the holder from rotating when inserted therein. The screw 8 is inserted into the space formed by a bevel 18 at the one upper end of the wedge 7 and this screw 8 is screwed in until it is in the position of FIGS. 3 and 4. In this position the wedge 8 bears downwardly on the plates 1 and the outer element 6 bears upwardly on the guide 12, thereby forcing the plates 1 down into tight sealing contact with the manifold pipe 3.

Figure 7:
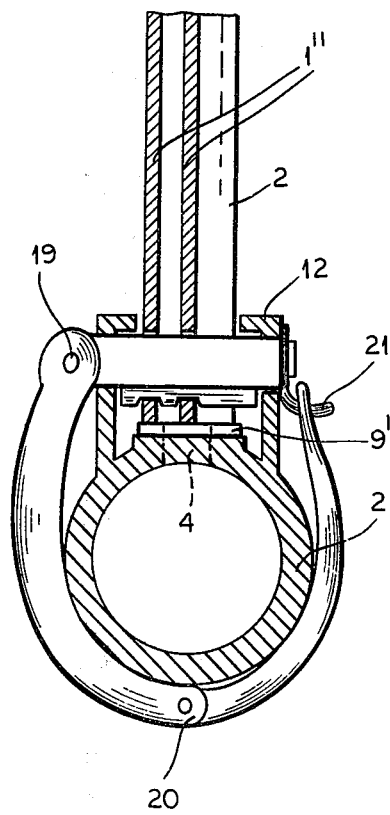
FIG. 7 is a view similar to FIG. 3 showing another arrangement according to this invention.

It is also possible as shown in FIG. 7 for the end of the element 6 opposite its flange 17 to carry a pivot pin 19 for one half of an articulated pipe clamp 20 whose other half is engaged over a hook 21 carried on the screw 8. Such a clamp 20 embraces the pipe 3 and provides a degree of extra security and holding force. In this engagement the seal strip 9 is eliminated and individual O-rings 9' are provided each with its central hole aligned with the respective manifold hole 4. These rings 9' are compressed like the strip 9 to form an excellent seal.

The arrangement according to the instant invention can be put together even by a relatively unskilled worker. The requisite number of plates 1 are first fitted to one of the manifold pipes 3 and secured in place by holders 6–8, then to the other. The manifold pipe can simply be cut off at the appropriate length and capped by means of an internal expanding plug at one end and provided with a threaded nipple at the other. The assembly of the system, once the manifolds are of the proper length, requires no tool beyond a screwdriver. The resultant structure will seal tightly, keeping in mind of course that a heat exchanger used either as a solar collector or radiator is not normally pressurized at high pressure, and can be produced at very low cost. Making both the manifold pipes 3 and plates 1 of extruded aluminum eliminates any problem of differential thermal expansion and simultaneously makes the assembly weatherproof.

We claim:

1. A heat exchanger comprising:
    a heat-exchange plate having an edge and formed with a plurality of parallel spaced-apart longitudinal passages opening at said edge and with a plurality of transversely throughgoing plate holes at said edge between said passages;
    a manifold pipe formed with a row of manifold holes all opening in the same direction and spaced apart the same as said passages at said edge, whereby said edge can be fitted over said row of manifold holes with each of said passages aligned longitudinally with a respective one of said manifold holes; a pair of L-section guides fixed on said pipe flanking said row of manifold holes and defining a gap corresponding to the shape of said plate at said edge, said guides being formed between said manifold holes with laterally throughgoing guide holes transversely alignable with said plate holes when said edge is fitted over said row of manifold holes; and
    means including a plurality of holders engageable transversely through the aligned guide and plate holes for securing said plate to said manifold pipe for fluid flow between said passages and the interior of said pipe.

2. The heat exchanger defined in claim 1, further comprising at least one seal overlying said row of manifold holes and formed with seal holes aligned with said manifold holes.

3. The heat exchanger defined in claim 1 wherein said guides are unitary with said manifold pipe.

4. The heat exchanger defined in claim 3 wherein said plate has a pair of opposite faces at least one of which is nonplanar, said guides having lips closely transversely juxtaposed with and complementarily shaped to said faces of said plate at said edge thereof when said one edge is fitted over said row of holes.

5. The heat exchanger defined in claim 1 wherein said guide and plate holes each have at least one flat side and said holders are of corresponding section, whereby said holders cannot rotate when fitted in said guide and plate holes.

6. The heat exchanger defined in claim 5 wherein each of said holders has a U-section holder part normally engaging only said guide holes and a wedge part normally engaging only said plate holes and bearing against the respective U-section holder part in such a direction as to urge said edge of said plate longitudinally against said manifold pipe.

7. The heat exchanger defined in claim 6 wherein each of said holders further has a screw engageable between the respective holder part and wedge for urging same apart.

8. The heat exchanger defined in claim 6 wherein said wedges are each formed with a notch engaged over the respective plate at the respective plate hole.

9. The heat exchanger defined in claim 6 wherein said holder parts are each formed with a rim flatly engageable with one of said guides when inserted into said guide and plate holes.

10. The heat exchanger defined in claim 1 wherein said holders include clamps engaged around said manifold pipes.

* * * * *